May 27, 1930.   B. H. C. MATTHEWS   1,759,951
DEVICE FOR MEASURING ELECTRICAL QUANTITIES
Filed Dec. 6, 1928

INVENTOR
B. H. C. MATTHEWS

Patented May 27, 1930

1,759,951

UNITED STATES PATENT OFFICE

BRYAN HAROLD CABOT MATTHEWS, OF CAMBRIDGE, ENGLAND

DEVICE FOR MEASURING ELECTRICAL QUANTITIES

Application filed December 6, 1928, Serial No. 324,169, and in Great Britain December 14, 1927.

This invention relates to the measurement of nerve action and other small electric voltages which vary rapidly or are of brief duration, and the object of the invention is to provide new or improved means for measuring and recording such voltages.

Of the various instruments or devices at present available for indicating or recording rapidly changing voltages of very small intensity the most accurate is the cathode ray oscillograph, but this instrument suffers from the disadvantage that a single excursion of the electron stream will not affect a photographic plate. The voltage oscillation to be recorded must be repeated some thousands of times before a record appears on the plate, so that the instrument is incapable of recording changes such as those which depend on spontaneous activity of living tissues and cannot be exactly repeated.

According to the present invention an instrument is provided in which a magnetic armature mounted to move in a magnetic field varied by a current to be measured is adapted to indicate by its movements the changes in the current to be measured.

In one form of the instrument an iron tongue is supported at both ends between soft iron pole pieces of an electric magnet in such a manner as to be bent or twisted by field variation due to currents in a number of former-wound coils mounted on the pole pieces, a mirror or other indicator being fixed to the tongue. The pole pieces are made of special annealed soft iron so that hysteresis distortions are reduced to a minimum; also, owing to its method of mounting, the movements of the armature are very small, and the resistance of the magnetic circuit is very nearly constant, the deflection is therefore practically proportional to the current in the small coils. Errors or distortion due to the mechanical resonance effects can be reduced to a negligible quantity by designing the iron tongue so that its natural period of vibration is very high. The movements of the iron are damped by the magnetic damping of the exciting coils with their attached circuits, and may be damped still further by immersing the iron in oil.

In order that the invention may be readily understood reference will now be made to the accompanying drawings in which:—

Figure 1:
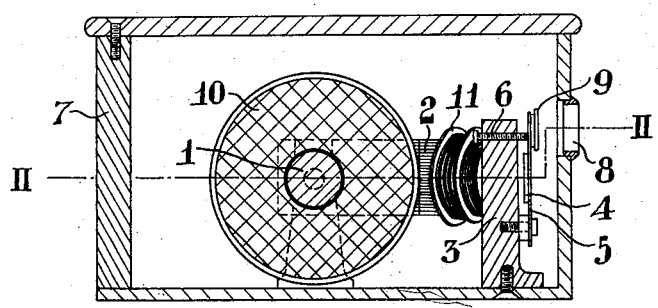
Figure 2:
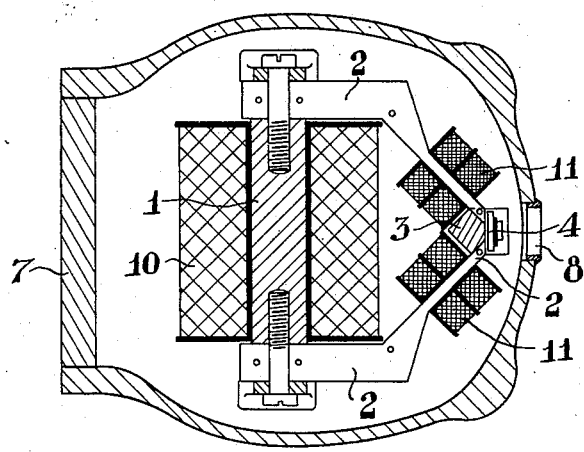

Figure 1 is a longitudinal section; and
Figure 2 is a sectional plan of an instrument constructed according to the preferred form of the invention, taken on line II—II of Figure 1.

As shown in the drawings, the instrument comprises a field magnet 1 having pole pieces 2 bolted or otherwise fixed to a vertical standard 3 of brass or other suitable non-magnetic material, and an armature 4 consisting of a strip of soft iron carried by a resilient strip 5 of steel or other suitable material screwed or otherwise fixed at its lower end to the standard 3. An adjustable set screw 6 mounted on the standard 3, adjacent the upper end of the strip 5, serves as a bearing support against which the upper end of the strip is pressed by the pull of the pole-pieces 2.

The complete system is mounted in a box or casing 7 having an aperture 8 through which a beam of light can be projected on to, and reflected from, a mirror 9 fixed to the upper end of the strip 5, which projects somewhat beyond the screw 6 as shown.

The field magnet 1 is excited by means of a main winding 10 which is connected to a suitable steady current supply such as a secondary battery (not shown) and the currents to be measured are passed through coils 11 mounted on the pole-pieces 2 so that the strong uniform field due to the winding 10 is varied by the currents in the coils 11 thereby bending the strip 5 and producing small changes in the angular position of the mirror 9. The pole pieces 2 are laminated so as to minimize eddy-currents.

Having now particularly described and ascertained the nature of my said invention, and in what manner the same is to be performed, I declare that what I claim is:—

A device for measuring electrical quantities comprising a field magnet inclusive of a pair of pole pieces, a standard of non-magnetic material, the pole pieces of said field magnet being converged with respect to one another and secured to said standard, a vibratory armature mounted on said standard and disposed for cooperation with said pole pieces, a mirror carried by said armature, and windings around said pole pieces adapted for connection with an electrical circuit whose quantity is to be measured.

In testimony whereof I have signed my name to this specification.

BRYAN HAROLD CABOT MATTHEWS.